United States Patent [19]

Bergstrom

[11] Patent Number: 5,350,119
[45] Date of Patent: Sep. 27, 1994

[54] CLAD METAL ORIFICE DISK FOR FUEL INJECTORS

[75] Inventor: John S. Bergstrom, Williamsburg, Va.

[73] Assignee: Siemens Automotive L.P., Auburn Hills, Mich.

[21] Appl. No.: 70,594

[22] Filed: Jun. 1, 1993

[51] Int. Cl.⁵ .............................................. F16K 27/00
[52] U.S. Cl. .................................. 239/585.4; 239/601; 29/17.3
[58] Field of Search ................... 239/601, 585.1–585.5, 239/533.12, 533.2–533.9; 428/663, 674; 29/17.3

[56] References Cited

U.S. PATENT DOCUMENTS

| | | | |
|---|---|---|---|
| 2,874,453 | 2/1959 | Losco | 428/663 |
| 4,477,027 | 10/1984 | Knapp et al. | 239/585.3 |
| 4,907,748 | 3/1990 | Gardner et al. | 239/601 X |
| 4,934,653 | 6/1990 | Grieb et al. | 239/585.1 X |
| 4,958,430 | 9/1990 | Grieb et al. | 29/888.02 |
| 5,100,102 | 3/1992 | Schechter | 239/585.4 |
| 5,192,048 | 3/1993 | Wakeman | 239/585.5 |
| 5,193,747 | 3/1993 | Preussner | 239/601 X |
| 5,207,384 | 5/1993 | Horsting | 239/585.4 X |

Primary Examiner—Andres Kashnikow
Assistant Examiner—Kevin P. Weldon
Attorney, Agent, or Firm—George L. Boller; Russel C. Wells

[57] ABSTRACT

The clad metal comprises a soft metal lamina overlay on a refractory metal lamina. An orifice is created by first punching a hole through the clad metal and then etching the soft metal lamina around the punched hole to create in that portion of the hole in the soft metal lamina a tapered entrance to that portion of the hole in the refractory metal lamina. The soft metal lamina is copper and the refractory metal lamina is molybdenum.

8 Claims, 1 Drawing Sheet

CLAD METAL ORIFICE DISK FOR FUEL INJECTORS

FIELD OF THE INVENTION

This invention relates to fuel injectors that inject fuel into internal combustion engines.

BACKGROUND AND SUMMARY OF THE INVENTION

U.S. Pat. No. 4,958,430 describes a method for manufacturing an orifice disk for a fuel injector from a flat metal strip that is processed by passing the strip through a progressive die. The finished orifice disk is a circle that comprises a central circular orifice. After the orifice disk has been assembled into the nozzle end of a fuel injector, the central circular orifice serves to meter the flow of fuel from the fuel injector. The circular orifice is created by punching a hole in the metal and then coining it.

Because the orifice performs a metering function, its dimensions are important in securing metering accuracy. It is fair to say that the greater the precision in those dimensions, the greater the metering accuracy.

The present invention arises in consequence of seeking further improvements in metering accuracy of an orifice disk member of a fuel injector. Briefly, the invention comprises an orifice disk that is fabricated from a strip of clad metal wherein the clad metal comprises a soft metal lamina overlay on a refractory metal lamina. An orifice is created by first punching a hole in the clad metal and then selectively etching the soft metal lamina around the punched hole. The selective etching is conducted in a manner that creates a taper in the direction of flow through the orifice. In this way the orifice is provided with a tapered entrance portion leading to a circular exit portion.

A preliminary novelty search conducted in connection with this invention developed U.S. Pat. Nos. 3,653,997 and 719,536.

The invention will be explained in detail in the ensuing description which is accompanied by a drawing illustrating a presently preferred embodiment according to the best mode contemplated at this time for carrying out the invention.

DESCRIPTION OF THE PREFERRED EMBODIMENT

Figure 1:
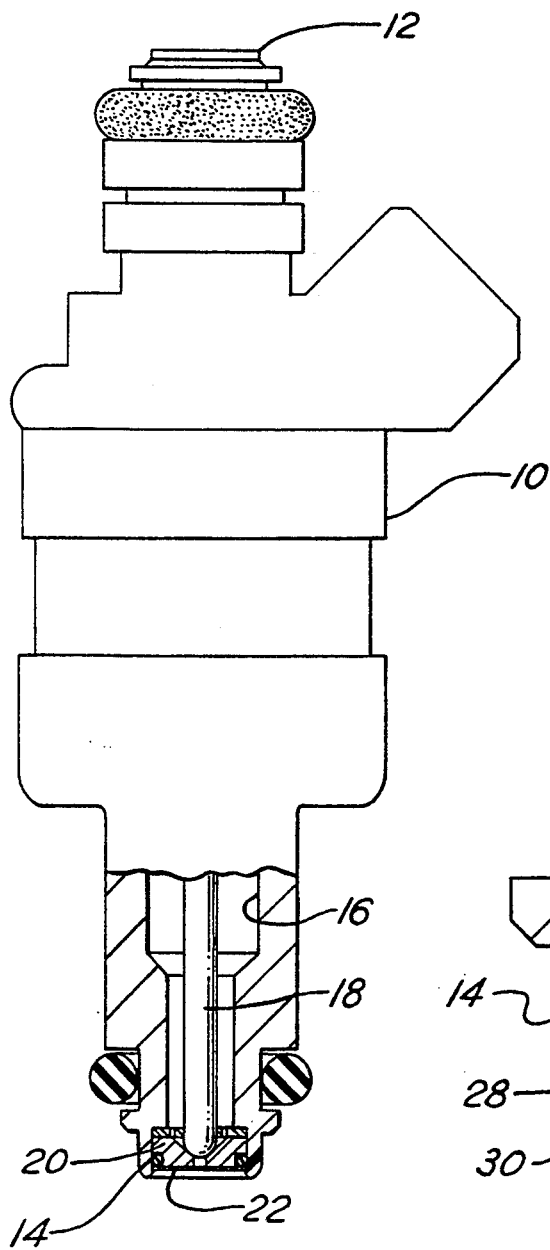
FIG. 1 is a longitudinal view, partly in cross section, of an exemplary fuel injector embodying principles of the invention.

FIG. 1 shows a fuel injector 10 of a type that is used to inject a volatile liquid fuel such as gasoline or the like into an internal combustion engine. Fuel injector 10 has an inlet 12 at one end, a nozzle 14 at the opposite end, and an internal fuel passageway 16 between inlet 12 and nozzle 14. Flow through passageway 16 is controlled by a solenoid-operated needle valve 18 having a rounded tip end that seats on and unseats from a valve seat in a valve seat member 20 at nozzle 14. Disposed against and beneath valve seat member 20 is an orifice disk member 22. It is orifice disk member 22 to which the present invention relates.

Figure 2:
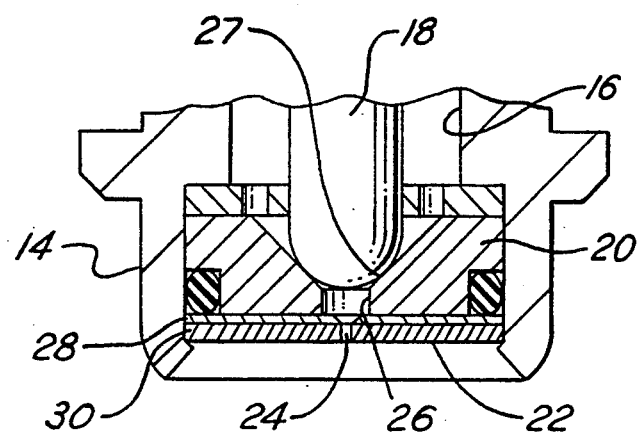
FIG. 2 is an enlarged view of a portion of FIG. 1.

As seen in expanded detail in FIG. 2, orifice disk member 22 comprises a central orifice 24 that is aligned with a hole 26 in valve seat member 20 leading from the frustoconical valve seat 27 with which the rounded tip end of needle valve 18 coacts. Orifice disk member 22 is fabricated from a clad metal strip comprising a soft metal lamina 28 and a refractory metal lamina 30. The thickness of the lamina can be adjusted to control the shape of the entry edge and pattern of the liquid jet. An example of a suitable soft metal lamina is copper and of a suitable refractory metal lamina is molybdenum.

Figure 3:
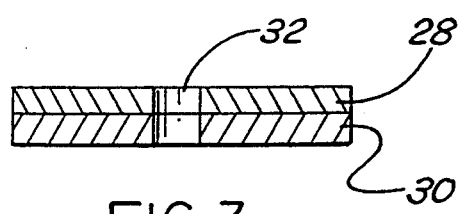
FIG. 3 is a cross sectional view through an orifice disk representing a condition assumed during the manufacturing process.
Figure 4:
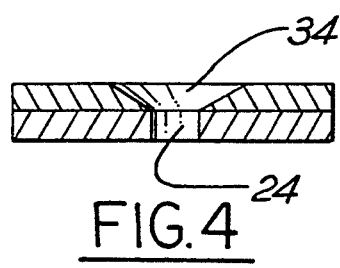
FIG. 4 is a cross sectional view similar to FIG. 3, but at completion of the manufacturing process.

Orifice 24 is fabricated by first punching a circular hole 32 through the strip as shown in FIG. 3. Then the portion of hole 32 that is in lamina 28 is etched by a suitable etchant to a desired shape, namely a frustoconically tapered shaped forming an entrance portion of the orifice. This desired shape is depicted by the reference numeral 34 in FIG. 4. Thus, in the finished orifice disk, orifice 24 comprises in lamina 28 a tapered entrance portion that has a narrowing taper in the direction of fuel flow, and in lamina 30 a straight metering portion through which fuel exits.

The etching of the entrance portion of the orifice is believed to produce a shape that cannot be achieved in small dimensions by punching and coining. The tapering entrance portion is believed to produce improved performance of the orifice.

While a presently preferred embodiment of the invention has been illustrated and described, it should be appreciated that the inventive principles are applicable to other embodiments that fall within the scope of the following claims.

What is claimed is:

1. A fuel injector for injecting fuel into an internal combustion engine comprising a body having a fuel inlet at which pressurized fuel is received, a nozzle from which fuel is injected, a passageway between said inlet and said nozzle, a valve seat member disposed in said passageway, electrically-operated valve means cooperating with said valve seat member for controlling flow through said passageway to said nozzle, and an orifice disk member at said nozzle downstream of said valve seat member, said orifice disk member comprising an orifice through which fuel is injected from the fuel injector, characterized in that said orifice disk member comprises a clad metal comprising a soft metal lamina and a refractory metal lamina, said orifice extending through said soft metal lamina and said refractory metal lamina.

2. A fuel injector as set forth in claim 1 characterized further in that said soft metal lamina is upstream of said refractory metal lamina.

3. A fuel injector as set forth in claim 2 characterized further in that said soft metal lamina is copper and said refractory metal lamina is molybdenum.

4. A fuel injector as set forth in claim 2 characterized further in that in a portion of said orifice that extends through said soft metal lamina has a taper that narrows in the direction toward said refractory metal lamina.

5. A fuel injector as set forth in claim 4 characterized further in that said portion of said orifice that extends through said soft metal lamina has a frustoconical taper and a portion of said orifice that extends through said refractory metal lamina is a straight cylinder that forms a continuation of said portion of said orifice that extends through said soft metal lamina.

6. In a method of making a fuel injector which has a body having a fuel inlet at which pressurized fuel is received, a nozzle from which fuel is injected, a passageway between said inlet and said nozzle, a valve seat member disposed in said passageway, electrically-operated valve means cooperating with said valve seat member for controlling flow through said passageway to said nozzle, and an orifice disk member at said nozzle downstream of said valve seat member, said orifice disk member comprising an orifice through which fuel is injected from the fuel injector, the steps comprising: fabricating said orifice disk member from clad metal comprising a soft metal lamina and a refractory metal lamina, including fabricating said orifice extending through said soft metal lamina and said refractory metal lamina, and assembling said orifice disk member into said nozzle downstream of said valve seat member.

7. In a method as set forth in claim 6, said fabricating step comprising creating said orifice by first punching a hole through said soft metal lamina and said refractory metal lamina, and then etching a portion of said hole in said soft metal lamina.

8. In a method as set forth in claim 7, said etching step comprising etching said portion of said hole in said soft metal lamina to a frustoconical tapered shape.

* * * * *